Aug. 4, 1959  J. P. HOUNSELL  2,897,989
CRATE CART

Filed May 17, 1957  3 Sheets-Sheet 1

INVENTOR.
JOHN P. HOUNSELL
BY
Kimmel & Crowell
ATTORNEYS

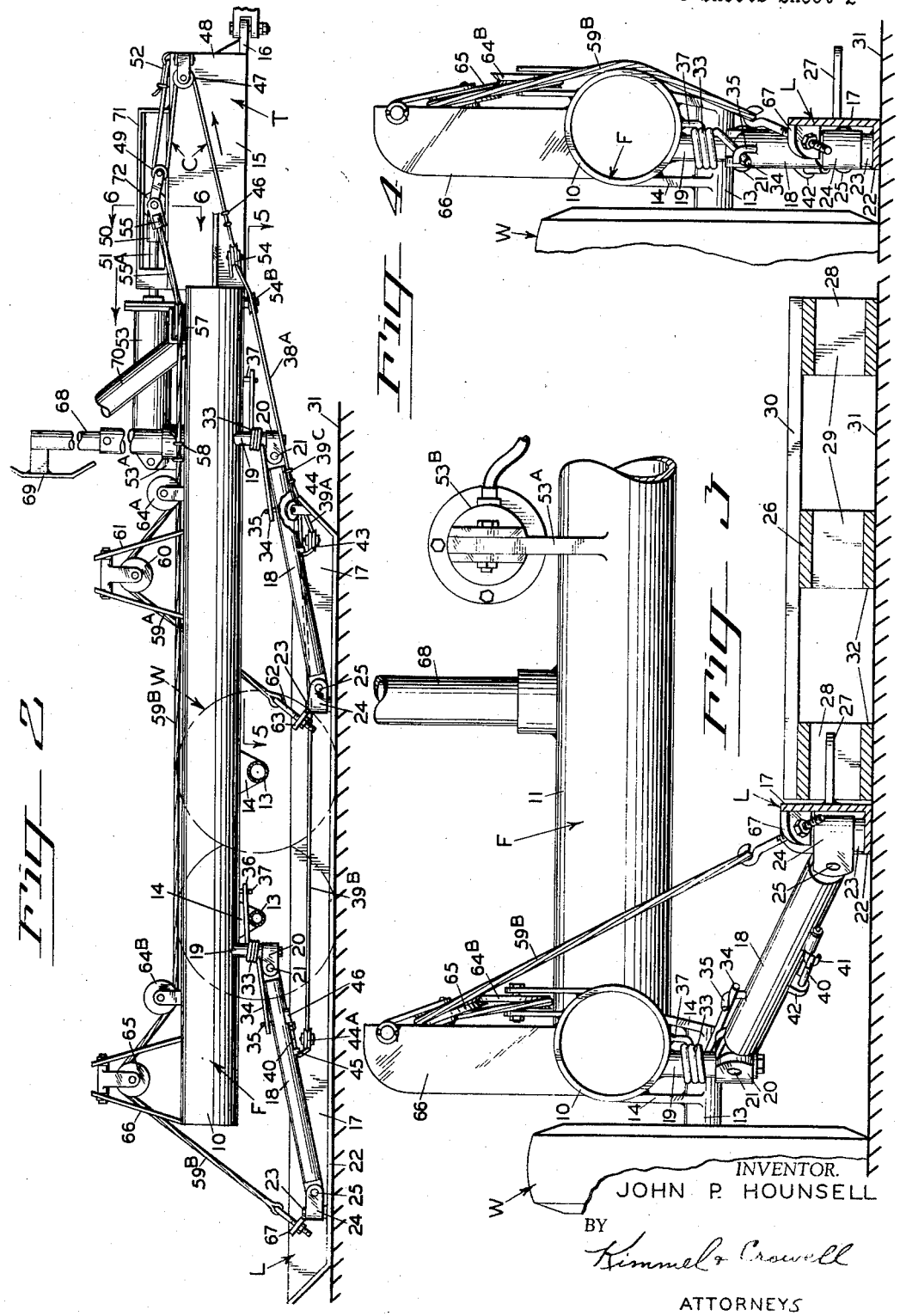

Aug. 4, 1959

J. P. HOUNSELL 2,897,989

CRATE CART

Filed May 17, 1957

INVENTOR.
JOHN P. HOUNSELL

BY
Kimmel & Crowell

ATTORNEYS 2,897,989
CRATE CART
John P. Hounsell, Hood River, Oreg.
Application May 17, 1957, Serial No. 659,833
5 Claims. (Cl. 214—390)

The present invention relates to carts for transferring crates of fruit, vegetables, or the like, particularly crates of fruits such as apples, pears, and other type of fruit to be picked up in orchards wherein space is limited between rows of trees.

The primary object of the invention is to provide a crate cart that can be towed behind tractors, having a minimum width and height so that the same can be maneuvered between the trees in its operation.

A further object of the invention is to provide a cart having means thereon operated from the truck or tractor by hydraulic fluid for lifting crates from the ground surface or lowering them to the ground surface. With this new and improved cart, the overall width of the same is little more than the width of a stack of crates.

Other objects and advantages will become apparent in the following specification when considered in the light of the attached drawings, in which:

Figure 2 is a side elevation of the invention with the supporting wheels in the foreground removed for convenience of illustration.

Figure 3 is an enlarged fragmentary transverse cross-section taken on the line 3—3 of Figure 1, looking in the direction of the arrows, and showing one of the pallets used therewith.

Figure 4 is a view similar to Figure 3 illustrating the pallet and crate carrying lifting assembly in laterally retracted position.

Figure 1:
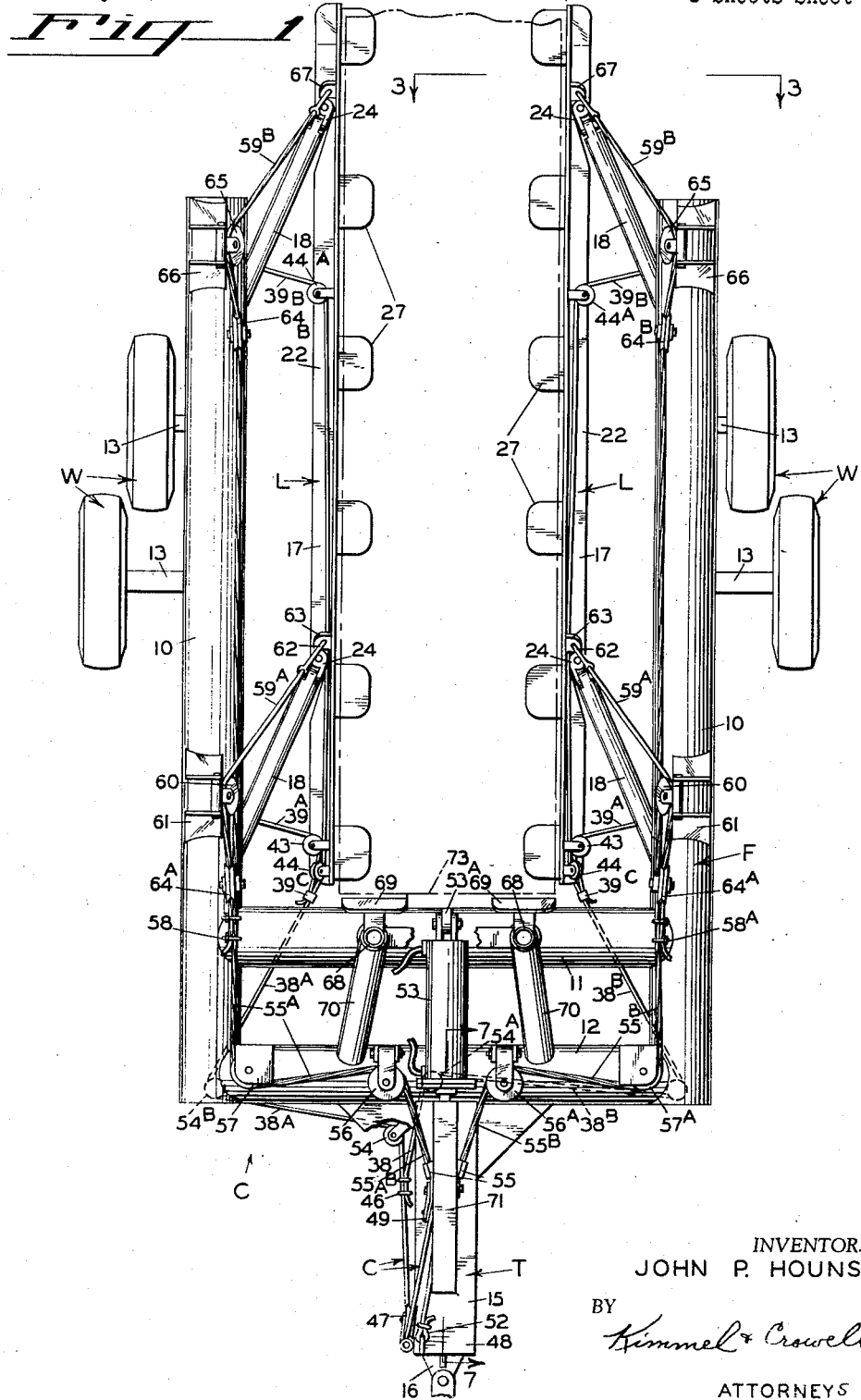
Figure 1 is a plan view of the invention with the position of the crates indicated by broken lines.

Referring now to the drawings in detail wherein like reference numerals indicate like parts throughout the several figures, the reference character C indicates generally my new and improved crate carrying cart which includes a horizontally disposed U-shaped framework F, mounted upon offset supporting wheels W and having a forwardly extending tongue T for attachment to a tractor (not shown).

The frame F includes a pair of spaced parallel relatively large tubular side frames 10, joined together at their forward ends by spaced parallel transverse tubular frame members 11 and 12. The frame F formed of large tubular members 10 joined at one end by frame members 11 and 12 provides a strong structure with a minimum of weight.

The relatively large tubular material of the frame F resists the twisting action imparted to the side frames 10 by offset supporting wheels W when under a heavy load, as well as the weight of the crates carried on the lifting and carrying mechanism. The wheels W are journalled on sub axles 13 fixedly secured to the under surface of the side frames 10 by brackets 14.

The tongue T includes a horizontal elongated tubular frame 15 secured to the cross frame 12 by welding or other suitable means. The tongue T is secured to the rear of a tractor or pick up truck by a hitch 16.

The pallet and crate lifting assembly L includes horizontally and parallelly disposed angle shaped lifting bars 17 supported under and inwardly of the side frames 10 by arms 18. The arms 18 are parallelly disposed in regards to one another and are pivotally mounted on spindle posts 19, extending downwardly from and forming part of the frames 10. The arms 18 are pivotally connected to the posts 19 by collars 20. The collars 20 support the arms 18 for vertical swinging movement on pivot pins 21.

Forming part of and extending upwardly from the horizontal leg 22 of the angle bars 17 are posts 23. Collars 24 are rotatably mounted thereon and have the arms 18 pivotally secured thereto by a pivot pin 25. The structure above described provides a universal connection of the arms 18 to the spindles 19 of the frames 10, and to the lifting bars 17 to permit the raising and lowering of the bars 17 and the retracting of the bars 17 to a position from that shown in Figure 3 to that shown in Figure 4.

The lifting bars 17 carry a plurality of horizontally extending spaced apart lifting toes 27 which enter the spaces 28 provided under the pallets 26 used for carrying crates.

Referring now to Figure 3, the spaces 28 are provided by spacer blocks 29 which support the upper crate supporting surface 30 of the pallets 26 above the ground surface 31. Longitudinal base members 32 secured to the underside of the spacer blocks 29 provide the spaces 28 for permitting the toes 27 of the lifting assembly L to enter the pallets 26 while resting on the ground surface 31. The structure of pallets 26 of this form is well known.

Coil springs 33 are wound about the spindle posts 19, with one of their ends 34 contacting a pin 35, fixedly positioned on the arms 18. The opposite ends 36 of the springs 33 bear against the pin or stop 37 fixedly mounted on the underside of the frames 10. The spring 33 forces the arms 18 toward the position shown in Figure 1.

Figure 5:
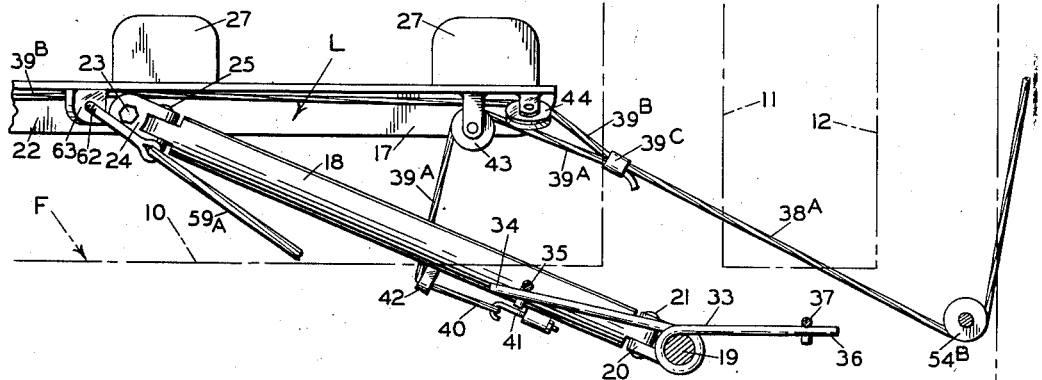
Figure 5 is an enlarged fragmentary horizontal section taken on the line 5—5 of Figure 2, looking in the direction of the arrows.

The arms 18 are moved to the retracted position illustrated in Figure 4 by the action of a cable C. The cable C includes a pair of portions 38a and 38b which each branch into a pair of cables 39a and 39b, referring particularly to Figures 2 and 5. The cables 38a pass around the sheave 54 to one side of the cart, while the cable 38b passes around the sheave 54a to the opposite side of the cart.

I will describe the action of one of these cables C, as for instance cable 38a. The cable 38a is trained about the sheave 54 and passes around the sheave 54b under the frame 10. The outer end 40 of a cable 39a is secured to a hook 41 after passing through the ear 42 forming part of the arm 18. The cable 39a is then trained about a sheave 43 journalled on the lift bar 17 and secured at 39c to the cables 38a and 38b. The cable 39b is trained about sheaves 44, 44a journalled on the lift bar 17, referring to Figures 1 and 2. The cable 39b then passes through the ear 45 forming part of the rear arm 18 of the lifting mechanism, and is secured to the rear arm 18 by the member 46.

The cable 38b is connected to the cable C by a connection 46. The cable C is trained about the sheave 47 journalled on forward end 48 of the tongue T. The cable C is then trained about a movable sheave 49 journalled to the outer end 50 of a piston rod 51 and secured at 52 to the end 48 of the tongue T.

On the movement of the piston rod 51 in the direction of the arrow, Figure 2, by action of the hydraulic cylinder 53, the cables C, 38a and 38b will be pulled in the direction of the arrow, which in turn will pull the cables 39a and 39b, pulling the lift bars 17 towards the arms 18. When this happens the lift bars 17 will be moved to the position shown in Figure 4 caused by the movement of the bars 17 towards the arms 18 pivotally mounted to the underside of the frame F by the spindle posts 19.

The movement of the lift bars 17 from the folded position as shown in Figure 4 to the position shown in Figures 1, 2, 3 and 5 is accomplished in the following manner. Cables 55a and 55b are fixedly secured by clamps 55 to the outer end 50 of the piston rod 51 and extend back to the lift bars 17 through sheaves 56, 57 and 56a, 57a, respectively, branching off at 58, 58a, respectively, into the cables 59a and 59b. The cable 59a passes over the sheave 60, which is journalled on the upper end of the bracket 61, as best illustrated in Figure 2, and secured at 62 to the ear 63 forming part of the angle bar 17.

The cable 59b extends rearwardly through the sheaves 64a and 64b over the sheave 65, which is pivotally mounted within the upper end of the bracket 66 and is secured to the ear 67 forming part of the angle bar L. The cable 55b has extending rearwardly therefrom an identical set of cables for the opposite side of the cart, as best illustrated in Figure 1. On the forward movement of the piston within the cylinder 53 and the piston rod 51 the cables 38a and 38b will be slacked off and the cables 55a and 55b will be pulled forward with the piston rod 51. This will pull the arms 18, forward of the cart, engaging the toes 27 with the sides of the pallet 26.

On engaging the sides of the pallet 26, the cables 38a and 38b will then lift the lift bars 17 upwardly by the action of the cables 55a, 55b passing over the sheaves 60 and 65 supported by the upwardly extending brackets 61 and 66. On the raising of the lift bars from the ground surface 31, the cables 38a and 38b will be completely slacked off.

Extending upwardly from the cross frame member 11 are vertical posts 68 having resilient bumper plates 69 secured to their upper ends, extending upwardly to a substantial height to contact the forward end of a stack of crates, indicating to the driver of the tractor the position of the cart in reference to the stack of crates.

Figure 7:
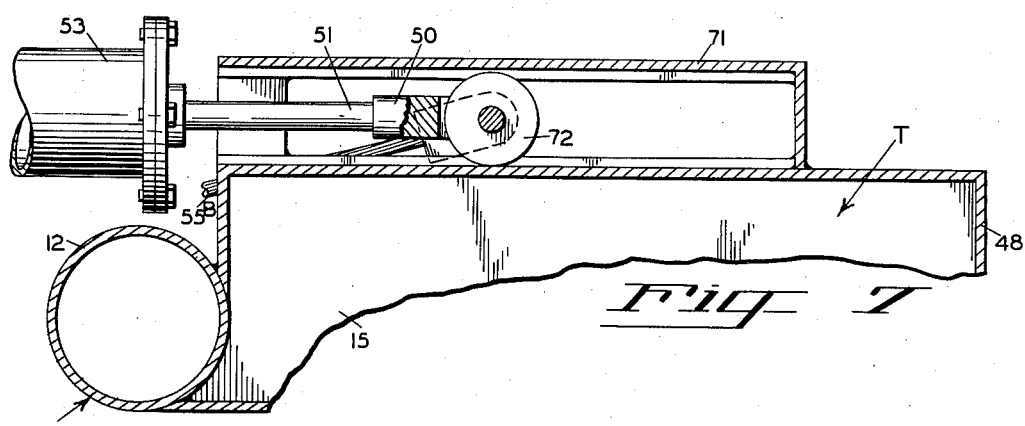
Figure 7 is a fragmentary longitudinal sectional view, taken on the line 7—7 of Figure 1, looking in the direction indicated.
Figure 6:
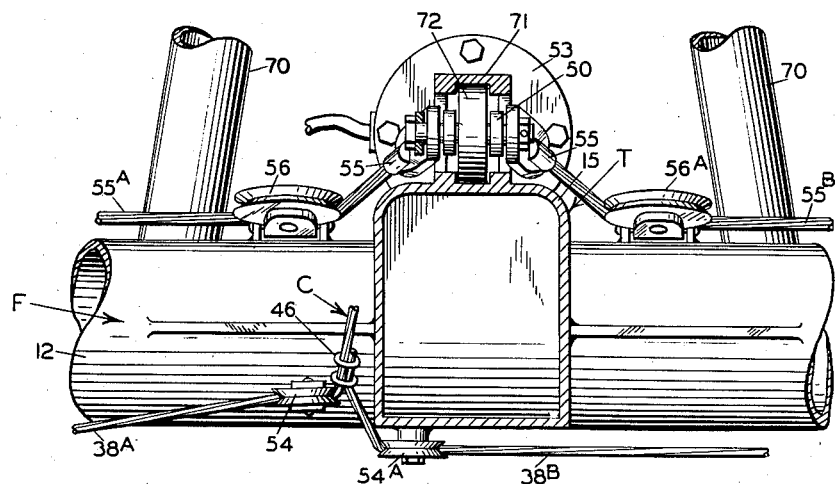
Figure 6 is a fragmementary vertical sectional view, taken on the line 6—6 of Figure 2, looking in the direction indicated.

The vertical posts 68 are braced by the braces 70 providing additional strength for absorbing the shock of the bumper 69 engaging the stack of crates. The outer end of the piston rod 51 is supported within a guideway 71 by a trunnion wheel 72, as best illustrated in Figures 6 and 7. The cylinder 53 is mounted to the cross member 11 on a bracket 53a by a king pin 53b.

The operation of this new and improved crate carrying cart is as follows. The lifting bars L are brought to the position shown in Figure 4 by the movement of the piston rod 51 in the direction of the arrow. This pulls the cables C, the cables 38a and 38b together with the branch cables 39a and 39b causing the lifting bars L to be pulled towards the arms 18 against the tension of the springs 33, as above described, aligning the lifting bars L under the frames 10. The bars L will then rest on the ground surface 31 when the trailer is being moved from place to place without a load.

The cart is then backed towards a stack of crates resting upon the usual pallet 26. Usually these stacks reach a height of six to eight feet. The frames 10 will straddle the stack of crates. When the cart backs a sufficient distance, the forward end 73 of the crates, indicated by broken lines, will contact the bumper plates 69 indicating to the operator in the tractor or truck that the cart has been backed a sufficient distance for picking the crates up. He will then operate his hydraulic controls (not shown) forcing the piston rod 51 in the cylinder 53 in the opposite direction of the arrow. This will slack the cables C and its associated branches above described, allowing the springs 33 to move the lifting bars towards the openings 28 of the pallets 26. This movement is further assisted by the tightening of the cables 55a and 55b. This will pull the cables 59a and 59b pivoting the arms 18 about the pivots 19, pulling the lifting bars L forward and inward entering their toes 27 within the opening 28 of the pallets 26.

When the lifting bars L contact the edges of the pallets 26, the cables 59a and 59b will be further pulled by the action of the piston rod 51 lifting the lifting bars L straight up, together with the load of crates to carrying position.

On reaching the destination to which the crates are to be transported, the operator operates the hydraulic control valve to cause the piston rod 51 to slack the cables 55a and 55b, together with the cables 59a and 59b, which will lower the pallets 26 and the stack of crates to the ground surface. On further slacking of the cables 59a and 59b, the cable C will begin to tighten, which will pull the lifting bars L towards the arms 18, bringing the lifting bars L to the position shown in Figure 4, as above described.

It will be noted that the wheels W are offset to one another, the purpose of this is to provide a wider supporting area on the ground surface in relation to the lifting bars L.

In order to make more clear the operation of this device, the movement inward of the lifting bars L has been exaggerated. Ordinarily the lifting bars L would travel a much less distance towards each other as sufficient distance is left to barely clear the pallet 26 for clearance when backing the cart into the same.

Having thus described the preferred embodiment of the invention, it should be understood that numerous structural modifications and adaptations may be resorted to without departing from the scope of the appended claims.

What is claimed is:

1. A crate cart comprising a horizontal tubular frame having a substantially U-shaped configuration including a pair of generally horizontal spaced apart side frames and a pair of spaced parallel transverse horizontal tubular frame members integrally connecting said side frames, wheels journalled on said side frames supporting said tubular frame in spaced relation to the ground, a pair of opposed horizontal lifting bars positioned in spaced parallel relation beneath said frame, a pair of spaced parallel arms extending from opposite end portions of each of said bars to spaced points on said side frames, means including horizontal and vertically extending pivots securing the one end of each of said arms to said side frames, means including horizontally and vertically extending pivots securing the other end of each of said arms to said lifting bars, said arms supporting said lifting bars beneath said frame for lateral and for vertical swinging movement, a plurality of cables connected to said lifting bars at longitudinally spaced points and extending to one end of said frame, and a hydraulic means on said tubular frame for moving said cables to initially swing said lifting bars horizontally inwardly into load engaging position with continued movement of said cable swinging said lifting bars vertically to lift the load with respect to the ground.

2. A device as claimed in claim 1 wherein said frame is supported on a pair of wheels on each side thereof with the wheels on each side thereof being laterally offset.

3. A device as claimed in claim 1 wherein spring means extend between said arms and said frame for normally biasing said arms and said lifting bars inwardly to load engaging position.

4. A device as claimed in claim 1 wherein said lifting bars are each provided with a plurality of lifting toes for engagement with a transfer pallet.

5. A device as claimed in claim 4 wherein said lifting toes are secured to said lifting bars in longitudinally spaced relation and vertically spaced above the longitudinally extending bottom edge portion of said bars.

References Cited in the file of this patent

UNITED STATES PATENTS

| | | |
|---|---|---|
| 1,271,947 | Ross | July 9, 1918 |
| 1,777,019 | Samuellson | Sept. 30, 1930 |
| 2,156,204 | Stolse | Apr. 25, 1939 |
| 2,410,965 | Dimick | Nov. 12, 1946 |
| 2,512,333 | Jaffa et al. | June 20, 1950 |